United States Patent
Foltyn et al.

(10) Patent No.: US 12,078,473 B2
(45) Date of Patent: Sep. 3, 2024

(54) MEASURING DEVICE AND METHOD OF DETERMINING A DEPTH OF FIELD OF AN OPTICAL SETUP

(71) Applicant: Universität Stuttgart, Stuttgart (DE)

(72) Inventors: Patrick Foltyn, Stuttgart (DE); Bernhard Weigand, Stuttgart (DE); Norbert Roth, Meßstetten (DE)

(73) Assignee: Universität Stuttgart, Stuttgart (DE)

(*) Notice: Subject to any disclaimer, the term of this patent is extended or adjusted under 35 U.S.C. 154(b) by 121 days.

(21) Appl. No.: 17/841,514

(22) Filed: Jun. 15, 2022

(65) Prior Publication Data
US 2023/0003512 A1   Jan. 5, 2023

(30) Foreign Application Priority Data
Jun. 17, 2021   (DE) .................. 10 2021 206 221.0

(51) Int. Cl.
G01B 11/22   (2006.01)
G01F 15/00   (2006.01)

(52) U.S. Cl.
CPC ............ G01B 11/22 (2013.01); G01F 15/001 (2013.01)

(58) Field of Classification Search
CPC ............................. G01B 11/22; G01F 15/001
USPC ........................................................ 356/614
See application file for complete search history.

(56) References Cited

U.S. PATENT DOCUMENTS

| | | | |
|---|---|---|---|
| 10,168,272 B2 | 1/2019 | Malissek et al. | |
| 2007/0279621 A1 | 12/2007 | Wojciechowski | |

FOREIGN PATENT DOCUMENTS

| | | | | |
|---|---|---|---|---|
| CN | 106053467 B | * | 2/2019 | ............ B01L 3/5027 |
| DE | 905672 C | | 3/1954 | |
| DE | 10 2015 113557 A1 | | 2/2017 | |
| FR | 2991787 A1 | * | 12/2013 | ........... G03B 21/608 |
| WO | WO-2018066868 A1 | * | 4/2018 | ............. G01B 11/25 |

OTHER PUBLICATIONS

ISO 8037/1, "Optics and optical instruments—Microscopes—Slides—Part 1: Dimensions, optical properties and marking", First Edition, pp. 1-4 (Sep. 15, 1986).
Merklinger, H. M., "The Ins and Outs of Focus : An Alternative Way to Estimate Depth-of-Field and Sharpness in the Photographic Image", Internet Edition, pp. 1-92 (Apr. 1, 2002).

* cited by examiner

*Primary Examiner* — Michael A Lyons
*Assistant Examiner* — Omar H Nixon
(74) *Attorney, Agent, or Firm* — Shook, Hardy & Bacon L.L.P.

(57) ABSTRACT

The present invention relates to a measuring device (10) and a method for determining a depth of field of an optical structure (100). In this case, the measuring device comprises a device body (12) with a measuring axis (14), the device body (12) being formed such that, in a measuring position, it can be placed in a stationary manner on a deposit plane of the optical structure such that the measuring axis (14) of the device body (12) coincides with an optical axis of the optical structure, wherein the device body (12) has a measurement scale (18) arranged along a scale line (16) such that the scale line (16) encloses with the direction of the measuring axis (14) a scale angle φ greater than 0° and less than 90° and the measurement scale (18) can be optically detected in the measuring position of the device body (12) by the optical structure (100) for determining the depth of field.

6 Claims, 4 Drawing Sheets

FIG 1A
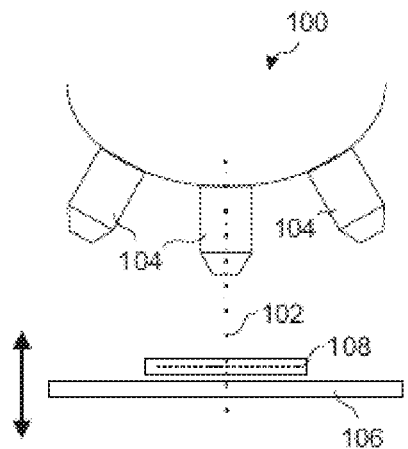
FIG 1B
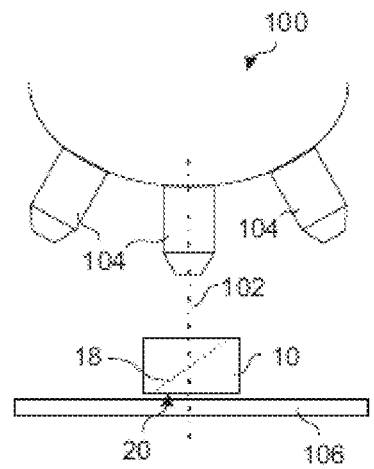
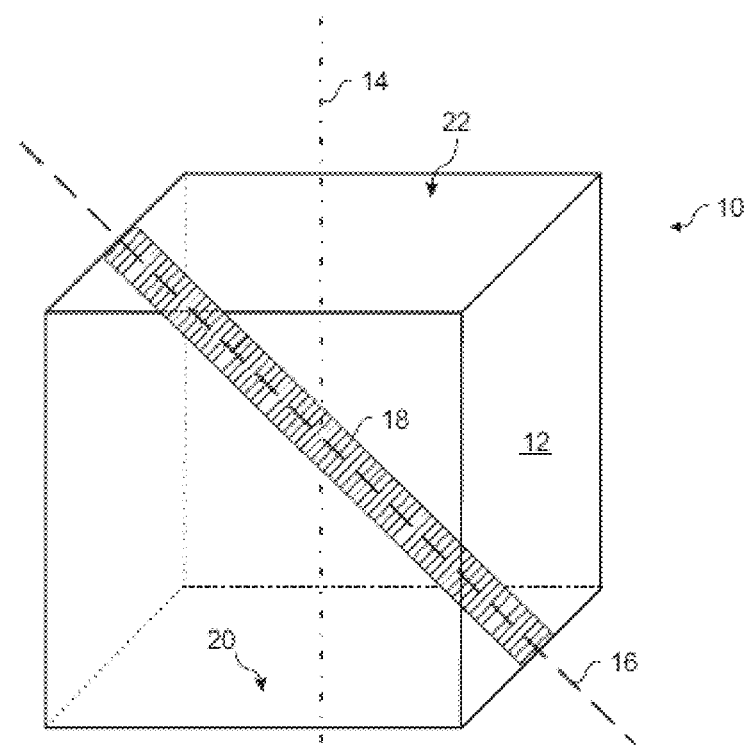
FIG 2

MEASURING DEVICE AND METHOD OF DETERMINING A DEPTH OF FIELD OF AN OPTICAL SETUP

This non-provisional patent application claims priority to co-pending German Patent Application No. 10 2021 206 221.0, filed on Jun. 17, 2021, and titled "Messvorrichtung and Verfahren zum Bestimmen einer Schärfentiefe eines optischen Aufbaus," the contents of which is incorporated herein by reference in the entirety.

The present invention relates to a device and a method for determining the depth of field of an optical structure, in particular optical microscopes.

Determining the depth of field of an optical structure such as an optical microscope is of utmost importance in many optical investigations, for example, in biology, metallurgy, process engineering or experimental structures. This can provide information about the depth range at which an acceptably focused image can be expected in the investigations. This is important, among other things, if the object to be measured cannot be placed easily and deterministically in the optical structure or in front of a lens of the optical structure, if the specimen to be observed are also extended in depth, or can move (fast). Examples include studies of droplet sprays or impact of droplets on surfaces, as well as the study and tracking of particles and organisms in microchannel flows. In these applications, auto-focus and multi-focus methods using methods of a sensor, a lens, or using fluid lenses are usually not feasible due to the speed of the focusing method.

In some cases, especially with very expensive microscopes, a simple calibration object, e.g. a line pattern, can be shifted in depth via a very precise shifting mechanism. The upper and lower shifting points at which the sharpness of the calibration patterns are barely acceptable define the range of the depth of field.

In addition, the depth of field (DOF) can also be determined mathematically, see, for example: Merklinger, H. M: The INs and OUTs of FOCUS (v1.03e). Published by the author. pg. 13 et seqq. (2002) ISBN 0-9695025-0-8, where the depth is the difference between the two distances $D_1$ and $D_2$:

$$DOF = D_2 - D_1 \quad (1)$$

with:

$$D_1 = \frac{f^2 D + gfD - gf^2}{f^3 - gf + gD} \quad (2)$$

$$D_2 = \frac{f^2 D - gfD + gf^3}{f^2 + gf - gD} \quad (3)$$

$$g = N\alpha \quad (4)$$

Here, $D_1$ corresponds to the distance of the lens to the near point and $D_2$ to the far point on the specimen side, with previously defined accepted diameters $\alpha$ of the circle of confusion. Other constants that enter into the equations are the focal length f, the f-number N and the distance of the focal point D in front of the lens. Since optical systems in the scientific field sometimes do not allow the unambiguous definition of the parameters so easily, an experimental determination of the depth of field is often almost essential.

It is therefore the task of the invention to simplify the experimental determination of the depth of field of an optical structure and to improve its accuracy. This task is solved by a device and a method with the features given in the independent claims. Preferred embodiments are the subject of the dependent claims.

Thus, in one aspect, the invention particularly relates to a measuring device for determining a depth of field of an optical structure, in particular a light microscope. For this purpose, the measuring device comprises a device body with a measuring axis, wherein the device body is formed such that it can be placed securely in a measuring position on an specimen-side deposit plane (in particular a microscope slide plane) of the optical structure such that the measuring axis of the device body coincides with an (specimen-side) optical axis of the optical structure. In particular, the device body preferably has a base area for this purpose, which is used to park the measuring device in the optical structure in the measuring position. Due to the stable parking, the measuring device can be moved into the measuring position for an accurate measurement of the depth of field in a reproducible manner In order to be able to carry out a measurement of the depth of field, the device body has a measuring scale plotted along a scale line such that the scale line with the direction of the measuring axis encloses a scale angle φ greater than 0° (preferably at least about 10°, more preferably at least about 20°, even more preferably at least about)30° and smaller than 90° (preferably not more than about 80°, even more preferably not more than about 70°, even more preferably not more than about)60° and the measuring scale in the measuring position of the device body can be optically detected by the optical structure for determining the depth of field. In other words, in the measuring position of the measuring device or measuring body, the measuring scale is visible and readable through the optical structure. For this purpose, the device body is preferably at least partially optically transparent along the measuring axis. This can be achieved by the device body being open or comprising an opening in the optically transparent area, or by the volume material of the device body being optically transparent in this area, e.g. in the form of glass. In particular, the device body may comprise or consist essentially of glass.

The measuring position thus determines the position of the measuring device relative to the optical structure or within the optical structure in which the depth of field can be determined. In particular, the measuring position is determined by an specimen-side focal point of the optical structure, i.e. the area in which an specimen to be examined is sharply imaged by the optical structure.

The measuring device is designed in such a way that the focal point of the optical structure on the specimen side lies in the area of the scale line when the measuring device is in the measuring position. The scale line can represent an optically not separately marked line, which (only) describes the course of the measuring scale. In a preferred embodiment, however, the scale line can also be designed as an optically visible (continuous or partially interrupted) line (for example, as part of the measuring scale).

By placing the measuring scale at an angle (as oblique) relative to the optical axis of the optical structure, the measuring scale extends simultaneously in an axial direction component of the optical structure and in a lateral direction. Thus the measuring scale (due to an axial course along the scale line) passes in particular through the entire focus range of the optical structure, i.e. in particular between a near limit and a far limit of the focus range. At the same time, the measuring scale (due to a lateral course along the scale line) can be read and evaluated through the optical structure. This makes it possible to read off the depth of field very accurately and with good reproducibility, from a single, instantaneous image of the measuring scale by the optical structure (e.g. by a single glance or a single snapshot),In particular, it is therefore not necessary to shift the focal plane of the optical structure for the purpose of measuring the depth of field.

In a preferred embodiment, the device body comprises an optically transparent block or it is formed by such a optically transparent block, inside which the measuring scale is formed. The device body or the optically transparent block is considered to be optically transparent in particular if light in at least one measurement wavelength range (which is used in particular as the wavelength range of an optical measurement by means of the optical assembly), which runs out from the measuring scale, to a proportion of at least 50%, preferably at least 75%, even more preferably at least 90%, most preferably at least 95% of the light power leaves the measuring device in the direction of the measuring axis (towards the optical structure).

Particularly preferably, the measuring wavelength is in the visible range, especially in a range of about 380 nm to 780 nm. In a preferred embodiment, the optically transparent block comprises glass or, preferably, is formed substantially of glass. Soda-lime glass, for example, is a preferred glass material. In a further aspect, Schott glass N-BK7 ® in particular may be considered.

The device body is thus formed in particular with an optical transparent block with the base area, a light emission surface and the measuring axis perpendicular to the base area and to the light emission surface such that the device body can be placed in the measuring position with the base area stationary on the deposit plane of the optical structure in such a way that the measuring axis of the device body coincides with the optical axis of the optical structure, wherein the device body in the interior of the optically transparent block comprises the measuring scale applied along the scale line such that the scale line with the direction of the measuring axis encloses the said scale angle and the measuring scale in the measuring position of the device body can be optically detected by the optical structure for the determination of the depth of field in that the light detected by the optical structure passes from the measuring scale through the light exit surface.

In a preferred embodiment, the optically transparent block is formed as a preferably straight, in particular four-sided prism, particularly preferably as a cube. This is particularly preferred and very useful when the deposit plane of the optical structure is perpendicular to its (specimen-side) optical axis, and when the measuring axis of the measuring device is perpendicular to a base area of the prism. This makes it possible to ensure that the light emanating from the measuring scale leaves the device body, in particular the optically transparent block, essentially symmetrically in the direction of the optical structure, thus achieving reading and evaluation of the sharpness representation of the measuring scale that is as distortion-free as possible and thus low in error.

In a preferred embodiment or application of the invention, the optically transparent block is formed as a microscope slide, in particular as an specimen micrometer.

In this context, a microscope slide is considered to be a carrier on which small objects (specimen) are (can be) observed microscopically, in particular by light microscopy. Such microscope slides are conventionally available in size and materials, and as microscope slides for light microscopy they often consist of a glass plate (also supporting glass) of size 76 mm×26 mm (DIN ISO 8037-1), and this size is also used for the transparent block in a preferred embodiment of the invention. Alternatively, the sizes 76 mm×52 mm, 76 mm×51 mm, 76 mm×38 mm, 76 mm×25 mm, 48 mm×28 mm and/or 46 mm×27 mm are preferred. In this case, values in the range of about 0.5 mm to about 3 mm, especially preferably up to about 2 mm, particularly preferably in the range of about 1 mm to about 1.5 mm are used as slide thickness. In the embodiment as a specimen micrometer, an additional (lateral or flat) micrometer scale is provided in or on the microscope slide, which is provided in particular in addition to the measuring scale used to measure the depth of field and, in particular, runs perpendicular to the measuring axis.

Particularly preferably, the scale line runs along a straight line which, with a normal direction to a base area of the transparent block (in particular the prism), encloses the scale angle φ, which preferably lies in a range from about 30° to about 60°, particularly preferably in a range from about 40° to about 50°, most preferably at about 45°. In particular, in this embodiment it is especially advantageous if the measuring scale at an optical refractive index n of the optically transparent block has periodic distances d along the scale line according to $$d = n 10^{-m} L / \cos \varphi \tag{5}$$

marked with an integer m as a decade multiple of a standardized unit of length L. Particularly preferably, the standardized unit of length is 1 meter according to the SI international system of units. With this scaling, the periodic distances correspond essentially to equivalent axial distances $d'_\alpha = 10^{-m} L$ in vacuum (or approximately in air).

They thus represent a direct measure of the depth of field in vacuum or air in the standardized unit of length L or in a decadic multiple thereof. This enables the effective depth of field of the optical structure in air or vacuum to be directly and easily detected. For example, at L=1 m and m=6, the depth of field can be read in units of μm. Of course, it is possible that the measuring scale marks periodic subdivisions of these distances into, for example, 2 or 5 equal subsections in addition to these periodic distances d. Particularly preferably, the measuring scale comprises a numerical labeling, which considerably simplifies the reading or counting through of the marked periodic distances.

This scaling is basically also applicable if the device body is open at least in the area between the measuring scale and the lens of the optical structure, or at least the measuring scale itself is not covered by an optical medium such as glass. In this case the refractive index n is the refractive index of the surrounding medium (e.g. air or about 1).

In a particularly preferred embodiment, the measuring scale is formed as an internal laser engraving. The technique of internal laser engraving is well established, particularly for glass, and can be applied very efficiently in the context of the present invention. Thus, the measuring scale in the device body is particularly protected and is not damaged during use.

In a further aspect, the invention relates to a measurement method for determining a depth of field of an optical structure. The method comprises first providing an optical dispersing medium in a measuring area around the specimen-side focal point of the optical structure, i.e. where the depth of field of the optical structure is to be measured. Preferably, providing an optical dispersing medium comprises introducing fog and/or smoke into the measurement area around the specimen-side focal point of the optical structure.

Furthermore, the method comprises projecting a measurement scale along a scale line within the measurement range such that the scale line includes with the direction of the specimen-side optical axis of the optical structure a scale angle φ greater than 0° (preferably at least about 10°, more preferably at least about 20°, even more preferably at least about)30° and smaller than 90° (preferably not more than about 80°, even more preferably not more than about 70°, even more preferably not more than about)60° and the measuring scale is optically detectable by the optical structure for determining the depth of field. In particular, the measurement scale becomes detectable by the light dispersing from the optical dispersing medium for the optical structure. In particular, the measurement scale is projected into the measurement area as a 3-dimensional light or laser projection in the manner of a hologram, with the light being dispersed by the optically dispersing medium and detected by the optical structure. The optical dispersing medium is preferably only dense enough to cause sufficient dispersing of the projected light in the area of the projected measuring scale, but to allow the dispersed light representing the measuring scale to be detected for the most part outside the measuring range for the optical structure. The predominant part of the light of the projected measuring scale should therefore preferably be detectable by the optical structure without further dispersion.

Finally, the method comprises a detection of the limits of the area of the projected measurement scale which is shown as sharp by the optical structure within the scope of a tolerance criterion. These limits represent, in particular, the near limit and the far limit of the sharpness range and are identified by the fact that there the measuring scale itself passes from an out-of-focus to a sharp range (or vice versa). For the structure of the measurement scale (in particular the direction, the shape, the size, the graduation, etc.), the analogous features to the measuring device described here preferably apply in the method according to the invention.

Particularly preferably, the method according to the invention is applied, in particular in one of the preferred embodiments described herein, to a set-up for flow measurement in at least one flow channel, wherein the measuring range lies at least partially within the at least one flow channel.

In such an application, the optically dispersing medium used to measure the depth of field can simultaneously be a medium whose flow behavior is to be determined or which is used to determine the flow pattern of a carrier medium. A particular preferred application is a particle image velocimetry (PIV) measurement.

The invention is described below by way of examples of preferred embodiments with reference to the accompanying figures.

THE FIGURES SHOW THE FOLLOWING

FIGS. 1A-1B depict a schematic comparison of a conventional measurement of a depth of field (FIG. 1B 1A) and a measurement of a depth of field according to the invention (FIG. 1B) of an optical structure;

FIG. 2 depicts a measuring device according to a preferred embodiment of the present invention;

In particular, insofar as the same reference numbers are used in the partially separately described embodiments, corresponding explanations regarding the respective components, structures and functions are preferably also applicable in the respective other embodiments.

Figure 3A:
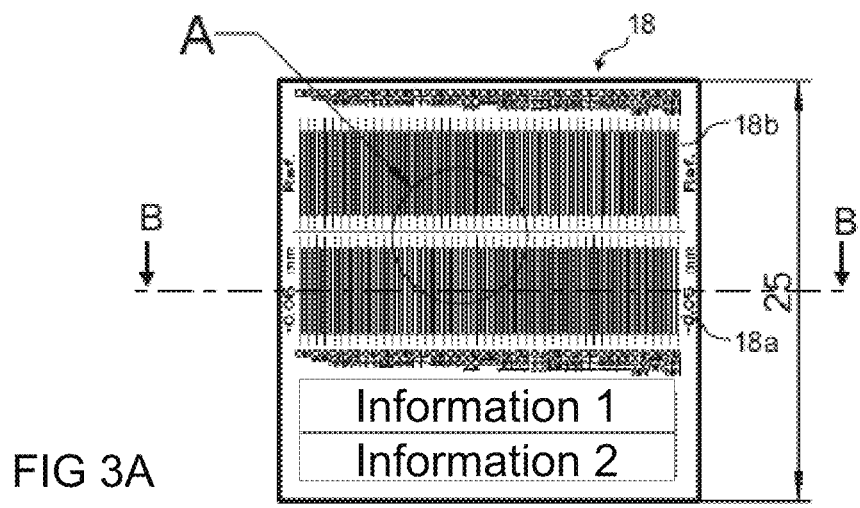
FIGS 3A-3C depict an exemplary measurement scale which can be used in a measuring 3A-3C device or method according to a preferred embodiment of the invention.

FIG. 1A illustrates a conventional approach to determining the depth of field of an optical structure 100. In the illustrated example, the optical structure relates to an optical microscope having a plurality of interchangeable lenses 104 mounted in an lens nosepiece. The respective active lens 104 defines an (specimen-side) optical axis 102 of the optical structure 100. In order to microscope a specimen, the specimen is positioned, in particular deposited, on a microscope slide device 106 of the optical structure. Now, to determine the depth of field of the optical structure, conventionally, for example, a conventional calibration pattern 108 is placed on the microscope slide device 106 such that the calibration pattern 108 is substantially parallel to a focal plane of the optical structure 100. By moving the microscope slide device 106 parallel to the optical axis 102, the calibration pattern 108 can be brought into the focal plane of the optical structure 100, where it is sharply imaged by the optical structure (within its optical resolution). An image sharpness that is still sufficient within a specified or desired tolerance is also achieved in a vicinity of the focal plane. The axial extent of this environment along the optical axis 102 is considered the depth of field. To determine this depth of field, the calibration pattern 108 is conventionally displaced between the two limits of focus (a near limit and a far limit, respectively on this side and on the other side of the focal plane) by means of the microscope slide device 106, and the axial displacement required for this is determined. This is usually performed by a user who assesses the respective impression of sharpness at the near or far limit and thus determines the respective position at the near or far limit in succession. Since the two positions are approached one after the other, the two sharpness impressions cannot be compared directly next to each other, so that a slightly different sharpness setting can occur here. In addition, this procedure requires a correspondingly accurate calibration of the axial displacement path of the microscope slide device.

In comparison, FIG. 1B illustrates a preferred embodiment of an approach according to the invention for the same optical structure 100. For this purpose, instead of a conventional calibration pattern 108, a measuring device 10 is placed on the microscope slide device 106 in accordance with a preferred embodiment of the present invention. In particular, this measuring device 10 is placed in a stationary manner on the microscope slide device 106 by means of a base area such that a measuring axis of the measuring device substantially coincides with the optical axis 102 of the optical structure 100. In the embodiment shown, the measuring device comprises a cuboid device body (block) within which a measurement scale 18 is formed obliquely or diagonally such that the measurement scale runs along a scale line (preferably a straight line), the scale line enclosing with the direction of the measuring axis (i.e. with the direction of the optical axis 102) a scale angle φ greater than 0° and less than 90°. In addition, the device body (block) is transparent, in particular, such that the measurement scale can be viewed through the activated lens 104. Now the microscope slide device 106 is preferably positioned in such a way that the scale line of the measuring device intersects the focal plane of the optical structure 100 in the region of the optical axis 102. In other words, the measurement scale 18 preferably passes through the focal plane of the optical structure 102 in the region of the measuring axis (i.e., in the region of the optical axis 102)—and such that it also passes through both the near limit and the far limit of the focus range of the optical structure while still within a field of view of the optical structure. This can be achieved in particular by selecting the scale angle φ small enough, i.e. preferably not greater than about 65°. Conversely, it is advantageous if the scale angle φ is not selected too small, since otherwise the points of passage of the measurement scale or scale line through the near and far limits of the focus range within the field of view are so close together that reading is difficult, which can then also impair the reliability of the evaluation and thus the achievable accuracy. Preferably, the scale angle φ is not smaller than about 25°.

With a procedure according to the invention, an evaluation of the depth of field can thus be carried out after positioning the measuring device once with a single glance or on the basis of a single image recording, without having to carry out a displacement of a calibration pattern during or in between.

FIG. 2 schematically shows a perspective view of a measuring device 10 according to a preferred embodiment of the invention. In this embodiment, the measuring device 10 consists essentially of a preferably glass, cube-shaped device body 12, inside of which a corresponding measurement scale 18 is embedded along a diagonal scale line 16. Preferably, the scale line 16 in this case runs as a straight line between the centers of two diagonally opposite cube edges. Preferably, the measurement scale 18 lies within a plane which is defined by the two diagonally opposite edges of the cube. The measurement scale 18 marks positions and distances in at least one direction parallel to the scale line. An exemplary embodiment of such a measurement scale is shown below.

For the application of this measuring device 10, the cube can be placed with one side surface, the base area 20, stationary. This is particularly the case when the specimen-side optical axis of the optical structure to be measured is vertical. Here, for example, the central perpendicular to the base area forms a measuring axis 14 of the measuring device 10, which can be brought into line with the said optical axis of the optical structure. As a result, the measurement scale 18 can be optically detected along the measurement axis by the optical structure such that light detected by the optical structure passes from the measurement scale substantially symmetrically about the measuring axis through a light exit surface 22 of the device body 12. Since the measurement axis 14 in a device body with a prismatic shape (in particular in the form of a straight prism), especially in a cube, is also perpendicular to the light-emitting surface 22 exactly when it is perpendicular to the base area 20, distortions of the measurements due to the refraction of light at the light-emitting surface are minimized The material of the device body 12 is preferably a dimensionally stable material that is transparent in the range of visible light. For example, glass is suitable for this purpose. The measuring scale can be produced, for example, by laser-induced internal glass engraving. Both the glass cube itself can be produced with very high quality in terms of material homogeneity, surface planarity and angles. In addition, glass is mechanically, thermally, optically and chemically stable and quite durable over time. Laser internal engravings can also be produced with very high precision. Finally, such glass interior engravings are protected and resistant to external influences.

Figure 3B:
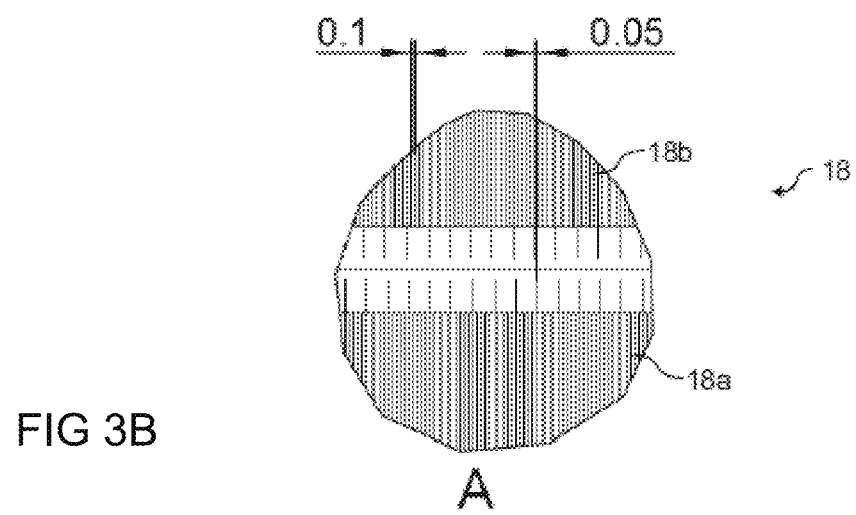
Figure 3C:
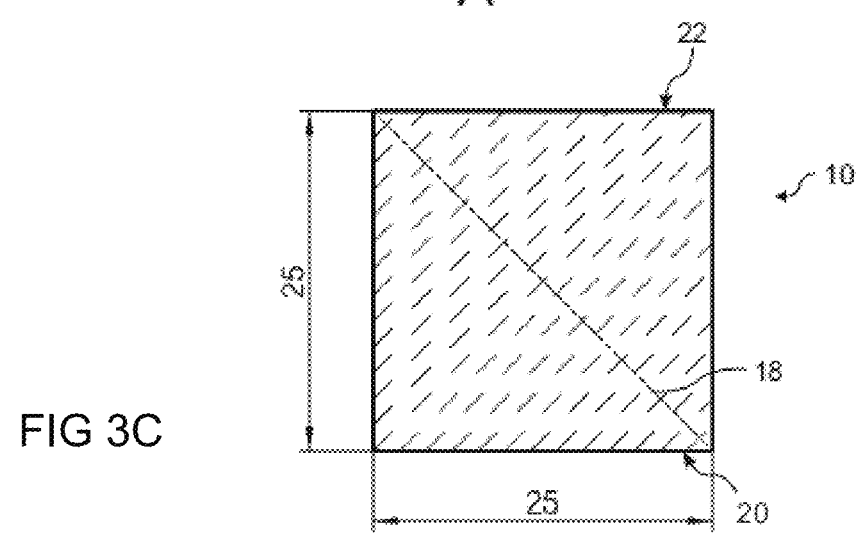

FIG. 3A to FIG. 3C show the embodiment of an exemplary measuring scale 18, such as can be used in a cube-shaped measuring device. FIG. 3A shows a parallel projection of the measurement scale in one direction along the measurement axis, i.e. the view of the measurement scale that can be observed from the direction of the optical structure. In this preferred embodiment, the measurement scale even comprises two (substantially parallel) sub-scales 18a and 18b. In one embodiment, it is conceivable that the two subscales in the measuring position of the measuring device can be detected simultaneously by the optical structure. Alternatively or additionally, it is also possible that the measuring device is shifted perpendicular to the optical axis of the optical structure in such a way that selectively one of the two measuring scales is detected for determining the depth of field.

FIG. 3B shows an enlarged section of the measurement scale 18 from FIG. 3A in the area marked there A. The two partial scales 18a, 18b run parallel to each other and parallel to the scale line. The entire measurement scale 18 lies substantially in a plane extending as a spatial diagonal, as shown in FIG. 3C as a section through the device body (as a cube) along line B-B of FIG. 3A. A scale line in this case can be understood as any line that runs along the slope of this plane. Along such scale lines, the subscales mark periodic distances, which are labeled "0.1" in the projection of FIG. 3B. At least in the case of a straight scale line as in this case, the periodicity of the markings along the scale line also represents a periodicity of these markings with respect to their respective position in the direction parallel to the measurement axis—and thus in the measurement position parallel to the optical axis of the optical structure.

In addition, the markings can also be detected and distinguished in the image field of the optical structure at least when they are in the focus range of the optical structure. In this way, the limits of the sharpness range can be determined in the image field of the optical structure as the outermost markers that are still (sufficiently) sharp. Due to the periodicity of the distances between the markings, it is thus very easy to count or directly read off the total size of the area of focus, i.e. a measure of the depth of field. Direct reading is preferably supported and simplified by labeling the markings (with numbers). In the illustration of FIG. 3B, for example, the two sub-scales are shifted relative to each other by half of their periodic distances in order to improve the resolution of the entire measurement scale 18.

The measurement scale is thus inserted along the scale line or measurement section in such a way that it runs diagonally and permits optical measurement of the depth of field for both incident light and transmitted light setups. The measurement scale can be adjusted and labeled so that the depth of field can be read directly. This is comparable to measuring a linear dimension. A conversion by means of angles due to possible projections is therefore not necessary.

Using the previously described equations (1)-(4), the depth of field in air can be calculated analytically. Using the Snellius law of refraction in equation (5), the influence of introducing a medium with refractive indesx $n_2$ into the surrounding medium ($n_1$) on the position of the focal plane and the front and rear focal points (equations (2) and (3)) can also be described. Here, α represents the angle of incidence and angle of reflection of the light rays into the medium.

$$n_1 \sin(\alpha_1) = n_2 \sin(\alpha_2) \qquad (6)$$

The surrounding medium is preferably air, but can also be an immersion liquid or other gas depending on the specific application. The relative displacement of the focal plane, due to the introduction of a medium with a refractive index $n_2$ different from the ambient medium ($n_1$) can be analytically derived to the following ratio:

$$\frac{\Delta d}{d} = \frac{\tan(\alpha_1)\sqrt{1 - \left(\frac{n_1}{n_2}\sin(\alpha_1)\right)^2}}{\frac{n_1}{n_2}\sin(\alpha_1)} - 1 \quad (7)$$

Here, d corresponds to the distance of the focal plane to the effective lens or lens plane and $\alpha_1$ corresponds to the angle of incidence of the rays at the optical transition from ambient medium to the scale-bearing medium. Using the numerical aperture for the ambient medium (index 1), defined in equation (8), equation (7) can be transformed so that equation (9) can be used to calculate the relative displacement of the focal plane as a function of the refractive indices and the numerical aperture.

$$A_{N,1} = n_1 \sin(\alpha_1) \quad (8)$$

$$\frac{\Delta d}{d} = \frac{n_2}{n_1} \frac{\sqrt{1 - \left(\frac{A_{N,1}}{n_2}\right)^2}}{\sqrt{1 - \left(\frac{A_{N,1}}{n_1}\right)^2}} - 1 \quad (9)$$

Here, due to the angular relationships, the angle of incidence $\alpha_1$ is equal to half the opening angle, which is used in equation (8). It can be shown using equation (9) that the focal plane shifts backward or away from the lens for the case $n_2 > n_1$. This behavior applies analogously to the front and rear focal points and the front and rear focus limits, respectively, which are defined in particular by the enveloping rays. Using the corresponding angles in equation (9), the exact position of the depth of field can thus be calculated.

It can be assumed that the depth of field is dependent on the refractive index to the same extent as given for the shift of the focal point in equation (8). The scale for determining the depth of field can thus be defined according to two criteria. It can be defined as a universally valid scale where the values of the depth of field can be read. By inserting the read values into equation (7) or (9), the exact depth of field can be calculated.

Alternatively, and particularly preferably, the measuring device and scale can be accurately designed for a particular measurement task using equations (7) and (9), respectively. The scale then already contains absolute values of the depth of field, so that the appropriate linear dimensions can be determined directly when reading off the scale. In particular, an example of this is shown in equation (5). For example, when using a medium with the refractive index $n_2=1.5$, markings on the measuring scale representing a measure of a depth of field of 1 mm are preferably placed at a geometric distance of about 2.1 mm from each other in the case of a scale angle of 45°.

Figure 4:
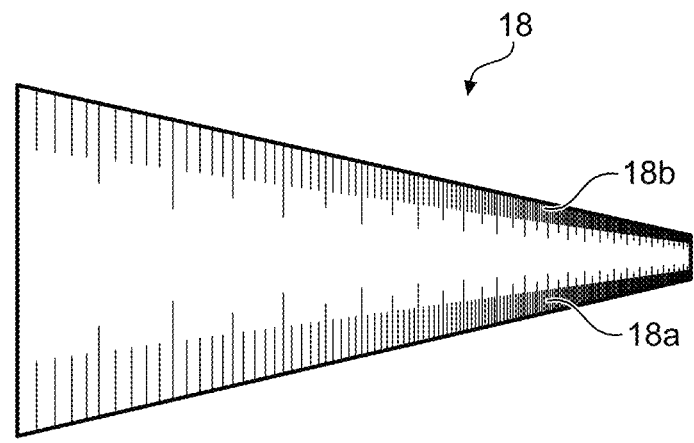
FIG. 4 depicts the representation of an image of a measurement scale in the image area of an optical structure.

A possible optical image of an exemplary measurement scale as it could be used in a measuring device according to the invention is shown in FIG. 4. In this example, the measurement scale again comprises two sub-scales, each scale section of which is a marker of periodic distances, in particular shorter and longer lines. For example, the longer lines with digits can be understood as representing position with mutual axial distances of 1 mm The shorter lines in between could represent position with mutual axial distances of 0.1 mm in one sub-scale and 0.05 mm in the other sub-scale. The marking with numbers makes counting and measuring even easier.

In particular, it can be seen in FIG. 4 that a central region of the measurement scale, namely that located in the specimen space near the focal plane, is shown in focus in the image area.

As the distance from the sharpest point increases, the measurement scale is further and further away from the focal plane and passes through the limits of the focus range. These limits and their distance to each other can be read at a glance or in a single image of the measurement scale through the optical structure without mechanical displacement of the measuring device after one-time positioning.

As mentioned above, FIG. 3C represents a sectional view through the device body. In it, exemplary side lengths of 25 mm of a corresponding cube are indicated. Particularly preferably, the side length of the device body, especially in the case of a cube shape, is in the range of about 5 mm to about 40 mm At this size, the device body is large enough to handle well manually and small enough for many applications.

Figure 5:
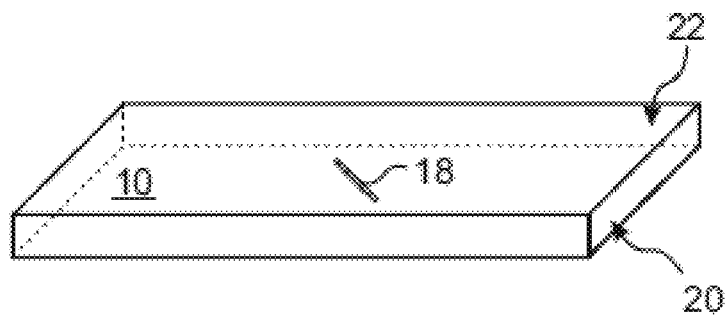
FIGS. 5-6 depict further measuring devices according to preferred embodiments of the present invention.
Figure 6:
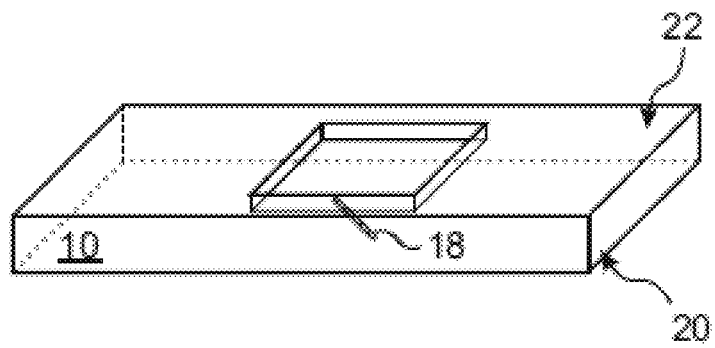

However, especially for applications in the field of microscopy with high magnifications and very short focal lengths and focal distances, it is also desirable to be able to use smaller or thinner measuring devices. Exemplary variants of such measuring devices for microscopes with high magnification are shown in FIG. 5 and FIG. 6. Thus, in these preferred embodiments, the device body is particularly in the form of a small microscope slide plate. It is even particularly preferred to design the device body also according to the size and material of standardized microscope slide plate. It is even possible to use such already existing microscope slide plates directly as device bodies and to provide them, for example by laser engraving, with a corresponding measurement scale which, when the device body is placed on a microscope slide device, then runs at an angle of more than 0° and less than 90°, particularly preferably in the range between about 30° and about 60° relative to the optical axis of the microscope lens and can be read directly through the microscope. Such measuring devices in the dimension of microscope slide plates are on the one hand very easy to handle and on the other hand highly compatible with the microscope slide plates of many microscopes. They are especially suitable for optical structures with very short focal lengths.

The particular embodiment of FIG. 6 even has a recess in a central region of the light-emitting surface 22 to accommodate an immersion liquid. The measurement scale is preferably arranged between this recess and the opposite base area 20. Thus, this embodiment is also directly applicable for immersion microscopy by filling the well with an immersion liquid.

With the method according to the invention, the depth of field can be determined with particularly high accuracy and reproducibility and with little effort. For example, glass bodies can be manufactured as device bodies and thus as carriers of the measuring scale with high accuracy. Laser-assisted (holographic) insertion of the measuring scale in particular is also possible with very high accuracy. Overall, this allows manufacturing tolerances that are below the resolution limits of the measuring equipment to be calibrated. At the same time, the measuring devices according to the invention can be manufactured very cost-effectively.

Due to the laser technology that can be used, almost free size scaling is possible, so that calibration and measurement devices can be manufactured in a size scale of a few hundred micrometers up to several centimeters. High-quality manufactured glass bodies (e.g. cuboids or cubes) also have very high edge and surface parallelism. In addition, the measurement scale (calibration pattern) has a known and very precisely manufactured angle, so that angular and distance errors are practically excluded or negligible if the measuring device is well placed in the measuring section.

However, the invention does not only concern the possibility of embedding a calibration pattern or a measurement scale into a fixed pattern carrier, but rather in general the 3-dimensional or holographic insertion of a characteristic calibration and measurement pattern, for example a (length) scale and possibly further patterns common from image processing (siemens star, line pairs, etc.), into a measurement space or specimen space, which is detected by an optical structure.

This can also be achieved, for example, the introduction of a light projection (or hologram) in smoke, liquid mist. Especially when using such a method according to a preferred embodiment of the invention, no fixed pattern carrier is required. This is particularly useful when the specimen space (measuring room) is very limited in space or very difficult to access for arranging or even fixing a sampled fixture due to the nature of the measurement to be made there.

For holograms or 3D light projections in liquid mist, smoke or similar, the arrangement is otherwise to be considered analogously. When the pattern is introduced in this way, there are also analogous advantages to using a measuring device according to the invention. By means of a simple image, a measurement of the depth of field can be performed immediately, without moving the specimen carrier or camera. Due to the light or laser technology used, almost free size scaling is possible even with a projection in smoke, liquid mist, or similar. Thus, an optical magnification setup (e.g. for microchannel flow) can be calibrated and measured in the same way as an optical reduction setup (e.g. for droplet experiments).

Preferred areas of application for a measurement method according to the invention for determining a depth of field of an optical structure by projecting a measurement scale into an optically dispersing medium are, for example, pressure chambers in which a spray is to be measured. In certain measurements, the deviation of particles from the focal plane is used to determine the position of particles in depth. Therefore, an accurate knowledge of the depth of field is quite crucial for such measurements. With the method according to the invention, for example, the depth of field can be re-measured very easily and quickly (especially without opening the pressure chamber) when the optics are changed or the optical structure is changed. In particular, the spray already present in the pressure chamber can be used as an optically dispersing medium. Through an optical window in the pressure chamber, the measurement scale can be projected into the pressure chamber by light projection such that the optical structure can detect this measurement scale due to the light dispersing by the optically dispersing medium.

Other particularly preferred areas of application for a method according to the invention concern PIV measurements (particle image velocimetry) or measurements of flows in ducts. Especially in many measurement constellations for flow measurement, it is very difficult or even impossible to measure the depth of field with a movable calibration pattern either due to the internal geometry of the flow arrangements or due to the external geometric boundary conditions. Thus, it is already difficult or hardly possible to bring the calibration pattern into the correct position in the area of the focal plane at all. Moving this along the optical axis in a controlled manner in order to measure the sharpness limits is very difficult or only possible with great inaccuracies.

In technical plants and also in scientific investigations, pipe flows of various kinds are very often measured. Measurement techniques such as PIV, shadowgraphs or schlieren are often used here. A particularly challenging example is the measurement of a round, conical vortex tube made of Plexiglas. Due to the conically opening inner diameter, the wall thickness is locally different. For the measurement, a LASER section through the tube illuminates the plane to be measured. The plane of the LASER section can be shifted as desired. One or two cameras with appropriate optics take the necessary images. The problem for a measurement of the depth of field of the camera(s) in this application is the accessibility into the vortex tube. For example, the tube is typically a complete, non-openable (Plexiglas) tube with dimensions of, for example, approx. 5-15 cm for the diameter and a length of 1.5 m.

Commercially, calibration plates for such tubes are usually only available as custom-made products. The effort and thus the costs of an individual production of calibration plates are extremely high due to the accuracy requirements. Moreover, holding the calibration plates in zthe middle of the tube is very challenging and precise adjustment of the position is also almost impossible. It is under such conditions that the method according to the invention can show its potential by light projection of a measurement scale into the measuring chamber. But even the use of a measuring device according to the invention can in this case already bring substantial advantages, since here no controlled mechanical displacement of a calibration pattern has to be performed during the measurement of the depth of field. The measuring device only has to be positioned once. For this purpose, the device body can also be adapted to the inner shape of the tube.

In the following, error limits and their possible reduction are still discussed. In particular, the error of the measuring device is composed of the geometric errors generated by inadequacies of the device body (e.g. glass cube) as pattern carrier and the patterns introduced as measurement scale along the scale line. This includes in particular the geometric error due to imperfect shape of the fixture body using the example of a glass cube as pattern carrier. The following influencing variables play a role:

Surface flatness: typical values: ±0.08 μm

Surface parallelism: very high accuracies are also achievable here.

As an alternative consideration, the beam deviation data for beam splitter cubes can be used for comparison here. This is a much more difficult fabrication because there is a bonded interface between two prisms arranged to form a cube. The typical value for the deviation of the orthogonal laser beam are assumed here to be <±5 arcmin If the pattern is not carried by a glass body but is introduced by projection alone, e.g. in smoke, the accuracies of the projecting pattern generator have to be considered. No lump-sum estimate can be given here. However, due to mechanically high-quality constructions, these tolerances are also extremely small.

Figure 7:
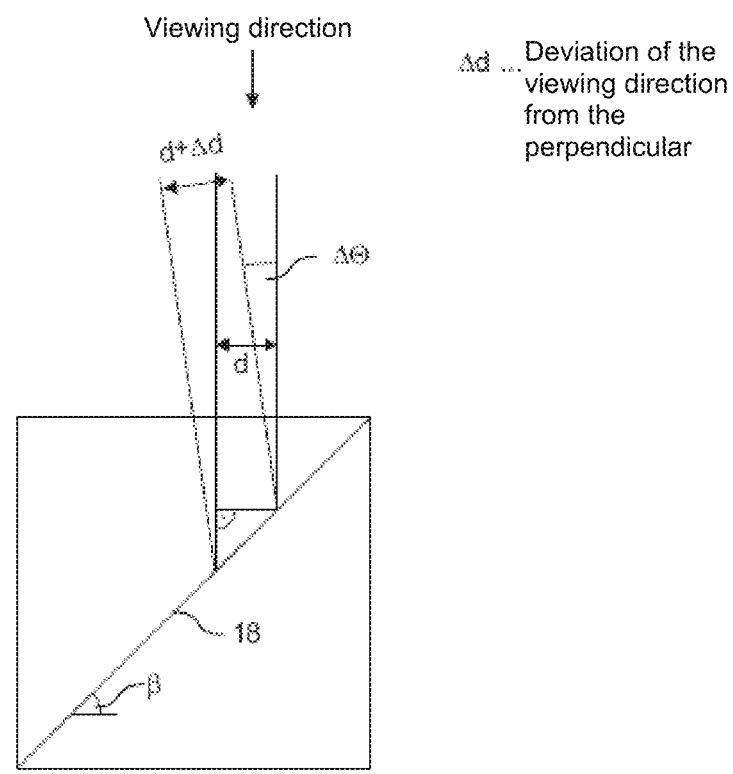
FIG. 7 depicts geometric representations to illustrate measurement errors.
Figure 7:
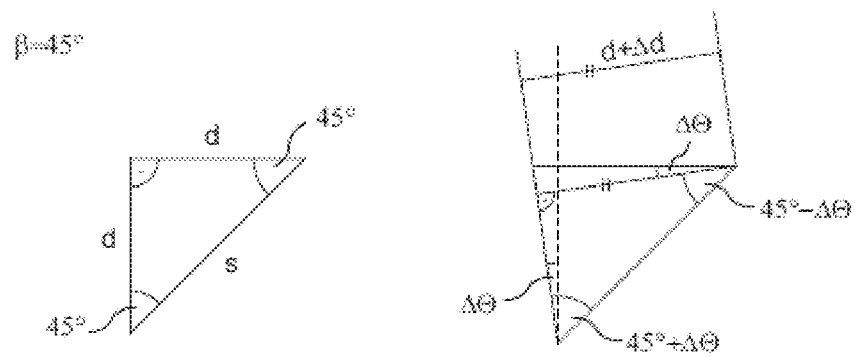

FIG. 7 illustrates the error calculation due to angular errors when viewing the patterns. Here, any refraction of the non-orthogonal light beam at the boundary surface of the pattern carrier is neglected due to the very small angles of well below one degree ($\Delta\theta \ll 1°$) to be expected. The following facts emerge:

$$\frac{d+\Delta d}{d} = \frac{\sin(\beta+\Delta\theta)}{\sin\beta}$$

with $\beta=90°-\varphi$ as the sample angle, preferably $\beta=45°$, and the angular error $\Delta\theta$ As an example, the errors for an angular deviation between $-1°$ and $+1°$ are summarized in the following table (for $\beta=45°$).

| $\Delta\theta$ | $-1°$ | $-0.5°$ | $-5'$ | $0°$ | $+5'$ | $0.5°$ | $1°$ |
|---|---|---|---|---|---|---|---|
| $\frac{d+\Delta d}{d}$ | $-1.76\%$ | $-0.88\%$ | $-0.15\%$ | $0\%$ | $+0.15\%$ | $+0.87\%$ | $1.73\%$ |

The following applies to possible pattern errors due to imperfect insertion of the pattern: The pattern is preferably introduced into the measuring section by engraving glass from the inside using a LASER. However, the pattern can also be introduced as a projection in mist or spray. For both, the point diameter and the resolution of the point grid in relation to the dimension of the measurement section is decisive.

For insertion into a glass body, a comparison of representative data on available equipment from various manufacturers (CERION laser GmbH and Wisely Laser Machinery Limited) yields the following results:

|  | Cerion C-professional | WLASER 3D Crystal/Glass Laser Engraving Machine (4 KB) |
|---|---|---|
| Minimum Point Size: | 20 μm | 20 μm |
| Repeat accuracy: | 30 μm | 30 μm |
| Resolution: | No information | 800-1200 dpi |

A dot size of 20 μm and a resolution of 800-1200 dpi can therefore be assumed. This thus corresponds to approx. 30-45 points per millimeter. At the lower resolution of 800 dpi, a maximum error of ±32 μm can thus be assumed. At a resolution of 1200 dpi, this corresponds to only ±21 μm. Such an error in determining the depth of field is perfectly adequate for most metrological tasks. As an example: With a depth of field of about 500 μm, as the measurement setup of an exemplary drop test rig with very high optical magnification has, the error is 4.2%. Other, more commonly used test stands have greater depths of field, e.g. in the range of 25 mm, so that the error is only 0.084%. Depths of focus of several centimeters are also common in experimental test rigs for heat transfer tests. In addition to the commercially available equipment, it has already been possible in academia to create cavities in the glass that have a spacing of only 6 μm, which can therefore reduce the error even further.

In case of holographic insertion by means of a beamer or similar devices, the considerations here are analogous and therefore depend on the pixel/voxel size and the DPI resolution of the pattern generating generator. The total error is dominated in particular by the insertion of the pattern into the measurement section or specimen space. Here, for example, the errors can be in the range of up to about ±30 μm, which is perfectly sufficient for measuring the depth of field. Other measures for determining the depth of field have significantly higher errors with comparable effort, for example when using a meter scale (approximately one division unit of the scale, e.g. ±500 μm). In this case, it is not possible to measure the depth of field because the error is of the same scale as the depth of field itself.

LIST OF REFERENCE NUMERALS

10 Measuring device
12 Device body, block
14 Measuring axis
16 Scale line
18 Measurement scale
20 Base area
22 Light emission surface
100 Optical structure
102 Optical axis
104 Lens
106 Microscope slide device
108 Conventional calibration pattern

The invention claimed is:

1. A measuring device for determining a depth of field of an optical structure, comprising:
   a device body with a measuring axis, wherein the device body is formed such that, in a measuring position, it can be placed in a stationary manner on a support plane of the optical structure such that the measuring axis of the device body coincides with an optical axis of the optical structure, and
   wherein the device body comprises a measurement scale arranged along a scale line such that the scale line encloses with a direction of the measurement axis a scale angle $\varphi$ greater than 0° and less than 90°, and the measurement scale can be optically detected in the measuring position of the device body by the optical structure for determining the depth of field,
   wherein the device body comprises an optically transparent block within which the measurement scale is formed,
   wherein the measurement scale, at an optical refractive index of the optically transparent block, has periodic distances d along the scale line according to:

$d = n10 - mL/\cos\varphi$ marked with an integer m as decadic multiples of a standardized unit of length L according to the International System of Units SI.

2. The measuring device of claim 1, wherein the optically transparent block is formed substantially of glass.

3. The measuring device according to claim 1, wherein the optically transparent block is a straight, four-sided prism.

4. The measuring device according to claim 3, wherein the scale line runs along a straight line which, with a normal direction to a base area of the optically transparent block, encloses the scale angle $\varphi$, which lies in a range from about 30° to about 60°.

5. The measuring device according to claim 1, wherein the optically transparent block is designed as a microscope slide comprising a specimen micrometer.

6. The measuring device according to claim 1, wherein the measurement scale is formed as an internal laser engraving.

* * * * *